United States Patent
Tian et al.

(10) Patent No.: US 7,912,378 B2
(45) Date of Patent: Mar. 22, 2011

(54) MODULATING A SIGNAL USING A FRACTIONAL PHASE MODULATOR

(75) Inventors: Cechan Tian, Plano, TX (US); Takao Naito, Plano, TX (US)

(73) Assignee: Fujitsu Limited, Kawasaki (JP)

(*) Notice: Subject to any disclaimer, the term of this patent is extended or adjusted under 35 U.S.C. 154(b) by 1091 days.

(21) Appl. No.: 11/627,419

(22) Filed: Jan. 26, 2007

(65) Prior Publication Data
US 2008/0181332 A1 Jul. 31, 2008

(51) Int. Cl.
*H04L 27/20* (2006.01)
(52) U.S. Cl. ......... 398/185; 398/186; 398/187; 398/188
(58) Field of Classification Search .................. 398/185, 398/186, 187, 188
See application file for complete search history.

(56) References Cited

U.S. PATENT DOCUMENTS

| | | | | |
|---|---|---|---|---|
| 5,111,517 A * | 5/1992 | Riviere | ............................ | 385/11 |
| 5,151,957 A * | 9/1992 | Riviere | ............................ | 385/41 |
| 6,480,283 B1 * | 11/2002 | Williams et al. | ............... | 356/450 |
| 6,650,458 B1 * | 11/2003 | Prosyk et al. | .................. | 359/276 |
| 6,798,557 B1 * | 9/2004 | Leven | ............................ | 359/279 |
| 6,801,676 B1 * | 10/2004 | Liu | .................................. | 385/3 |
| 2003/0058504 A1 * | 3/2003 | Cho et al. | ...................... | 359/161 |
| 2003/0102938 A1 * | 6/2003 | Erlig et al. | ...................... | 333/156 |
| 2003/0175036 A1 * | 9/2003 | Mamyshev et al. | ........... | 398/188 |
| 2004/0028418 A1 * | 2/2004 | Kaplan et al. | .................. | 398/188 |
| 2004/0141222 A1 * | 7/2004 | Miyazaki et al. | ............. | 359/237 |
| 2004/0184819 A1 * | 9/2004 | Vassilieva et al. | ............ | 398/188 |
| 2005/0002676 A1 * | 1/2005 | Zitelli | ........................... | 398/188 |
| 2005/0180682 A1 * | 8/2005 | Griffin | ............................ | 385/16 |
| 2005/0243907 A1 * | 11/2005 | Dorrer et al. | .................. | 375/227 |
| 2006/0159466 A1 * | 7/2006 | Kim et al. | ....................... | 398/188 |
| 2006/0245764 A1 * | 11/2006 | Wernz et al. | .................. | 398/186 |
| 2006/0263097 A1 * | 11/2006 | Akiyama et al. | .............. | 398/188 |
| 2006/0263098 A1 * | 11/2006 | Akiyama et al. | .............. | 398/188 |
| 2007/0047966 A1 * | 3/2007 | Hironishi et al. | ............. | 398/161 |
| 2007/0070486 A1 * | 3/2007 | Tian et al. | ...................... | 359/239 |
| 2007/0071453 A1 * | 3/2007 | Liu et al. | ........................ | 398/183 |
| 2007/0177882 A1 * | 8/2007 | Akiyama | ......................... | 398/185 |
| 2007/0264028 A1 * | 11/2007 | Yuki et al. | ...................... | 398/183 |
| 2007/0274731 A1 * | 11/2007 | Boffi et al. | ..................... | 398/188 |
| 2008/0013964 A1 * | 1/2008 | Noheji | ............................ | 398/202 |
| 2009/0086303 A1 * | 4/2009 | Ide et al. | ......................... | 359/279 |

(Continued)

OTHER PUBLICATIONS modulation. (2001). In Hargrave's Communications Dictionary, Wiley. Retrieved from http://www.credoreference.com/entry/hargravecomms/modulation.*

(Continued)

*Primary Examiner* — Ken N Vanderpuye
*Assistant Examiner* — Tanya Ngo
(74) *Attorney, Agent, or Firm* — Baker Botts L.L.P.

(57) ABSTRACT

A system operable to modulate a signal according to phase-shift keying (PSK) modulation includes one or more phase modulators that comprise one or more fractional phase modulators. A fractional phase modulator includes a splitter that splits a communication signal to yield a first communication signal with first amplitude and a second communication signal with second amplitude, where the ratio of the first and second amplitudes correspond to a phase shift. A phase shifter phase shifts the first or second communication signal. A first modulator modulates the first communication signal at a constant phase. A second modulator modulates the second communication signal at phases corresponding to the phase shift to encode data. A coupler couples the first communication signal and the second communication signal.

23 Claims, 4 Drawing Sheets

U.S. PATENT DOCUMENTS

2009/0092401 A1* 4/2009 Sekine et al. .................. 398/185
2009/0148171 A1* 6/2009 Chen et al. .................... 398/208
2009/0214226 A1* 8/2009 Mizuguchi et al. ............ 398/202

OTHER PUBLICATIONS

Ohm, Michael, et al., "*Differential Optical 8-PSK with Direct Detection (8-DPSK/DD)*", 4. ITG-Fachtagung, Leipzig, Mai 2003, Seite 177-181, 5 pages, 2003.

Kim, Cheolhwan, et al., "*Direct-detection optical differential 8-level phase-shift keying (OD8PSK) for spectrally efficient transmission*", Optics Express, vol. 12, No. 15, pp. 3415-3421, Jul. 26, 2004.

Kim, Cheolhwan, et al., "*WDM Transmission over 320 km EDFA-Amplified SSMF Using 30 Gb/s Return-to-Zero Optical Differential 8-Level Phase-Shift Keying (OD8PSK)*", OPTICS EXPRESS, vol. 13, No. 11, pp. 4044-4049, May 30, 2005.

* cited by examiner

MODULATING A SIGNAL USING A FRACTIONAL PHASE MODULATOR

TECHNICAL FIELD

This invention relates generally to the field of signal communication and more specifically to modulating a signal using a fractional phase modulator.

BACKGROUND

Signals may be modulated using phase-shift keying (PSK). In PSK modulation, changes in the phase of a signal are used to represent data. In multi-level PSK modulation, multiple bits may be transmitted per symbol, which allows for more data to be transmitted at a lower symbol rate. For example, 4-PSK modulation can transmit two bits per symbol, 8-PSK modulation can transmit three bits per symbol, and 16-PSK modulation can transmit four bits per symbol.

Multi-level PSK communication may impose particular requirements on a communication system. For example, multi-level PSK communication may be improved by communicating signals with purer phases. In general, a signal with a purer phase has shorter rise and fall times, and a signal with a pure phase may have essentially no rise or fall time. Known systems for modulating the signals, however, may not yield signals with satisfactorily pure phases.

SUMMARY OF THE DISCLOSURE

In accordance with the present invention, disadvantages and problems associated with previous techniques for modulating a signal using phase-shift keying modulation may be reduced or eliminated.

According to one embodiment of the present invention, a system operable to modulate a signal according to phase-shift keying (PSK) modulation includes one or more phase modulators that comprise one or more fractional phase modulators. A fractional phase modulator includes a splitter that splits a communication signal to yield a first communication signal with first amplitude and a second communication signal with second amplitude, where the ratio of the first and second amplitudes correspond to a phase shift. A phase shifter phase shifts the first or second communication signal. A first modulator modulates the first communication signal at a constant phase. A second modulator modulates the second communication signal at phases corresponding to the phase shift to encode data. A coupler couples the first communication signal and the second communication signal.

Certain embodiments of the invention may provide one or more technical advantages. A technical advantage of one embodiment may be that a fractional phase modulator may split a signal into first and second signals, where the ratio of the amplitudes of the signals correspond to a particular phase shift. The first signal may be modulated at a constant phase, and the second signal may be modulated at a varying phase in order to encode data. The first and second signals may be combined for to yield a transmitted signal with a purer phase.

Another technical advantage of one embodiment may be that the first and second signals may be modulated by Mach-Zehnder modulators. The Mach-Zehnder modulators may modulate with a purer phase, which may yield a transmitted signal with a purer phase.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
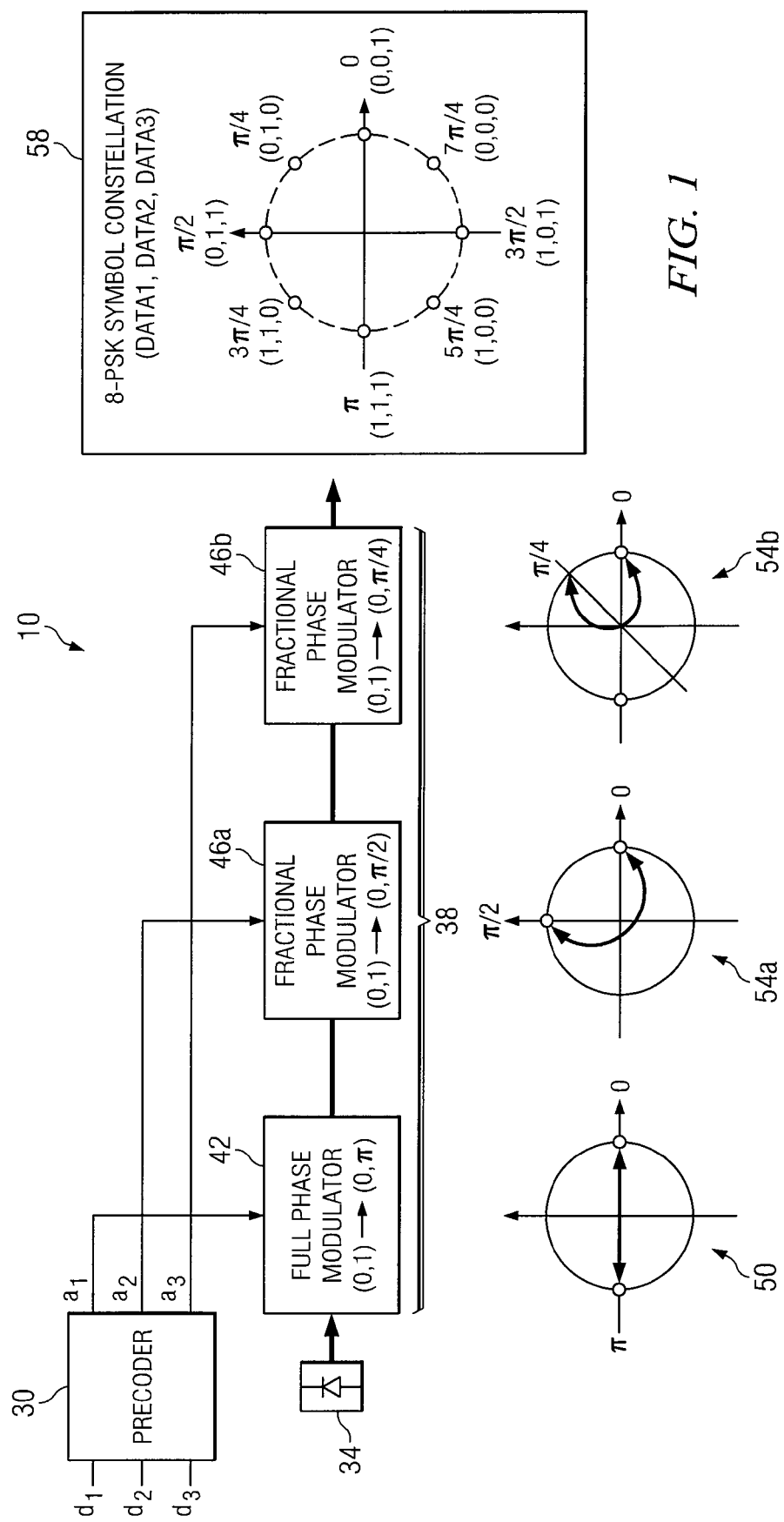
FIG. 1 illustrates one embodiment of a system for modulating a signal according to phase-shift keying (PSK) modulation.

FIG. 1 illustrates one embodiment of a system 10 for modulating a signal according to phase-shift keying (PSK) modulation. In the embodiment, a fractional phase modulator may split a signal into first and second signals, where the ratio of the amplitudes of the signals correspond to a particular phase shift. A first Mach-Zehnder (MZ) modulator may modulate the first signal at a constant phase, and a second Mach-Zehnder modulator may modulate the second signal at a varying phase in order to encode data. The first and second signals may be combined to yield a signal for transmission. The Mach-Zehnder modulators may modulate with a purer phase, so the combined signal may have a purer phase.

According to one embodiment, system 10 communicates signals. A signal may refer to an optical signal transmitted as light pulses. An optical signal may have a frequency of approximately 1550 nanometers, and a data rate of, for example, 10, 20, 40, or over 40 gigabits per second. A signal may communicate any suitable information such as voice, data, audio, video, multimedia, other information, or any combination of the preceding.

According to the illustrated embodiment, system 10 may be included in a transmitter that sends a signal to a receiver. According to the embodiment, the transmitter modulates the signal according to PSK modulation to encode data into the signal. The receiver demodulates the signal according to PSK demodulation to retrieve the data from the signal.

According to one embodiment, PSK modulation may refer to differential PSK (DPSK) modulation. In DPSK modulation, phase shifts between successive symbols represent bits. According to n-phase-shift keying (n-PSK) modulation, n different phase shifts may be used to encode p bits per symbol, where $n=2^p$. For example, differential binary PSK (DBPSK) uses two phase shifts to encode one bit per symbol, and differential quadrature PSK (DQPSK) uses four phase shifts to encode two bits per symbol.

According to the illustrated embodiment, system 10 includes a precoder 30, a light source 34, and a $2^p$-PSK modulation system 38 coupled as shown. Precoder 30 precodes data $d_i$ to yield data signals $a_i$ that represent data $d_i$. In the illustrated embodiment, i=1, 2, 3. Precoding may involve combining data $d_i$ and data signal $a_i$ such that the signals at receiver 28 may be restored after demodulation. Precoder 30 may comprise logic gates, such as OR, AND, XOR, delay, and/or other logic gates.

Light source 34 generates a communication signal that can be encoded with data $d_i$ to communicate data $d_i$. According to one embodiment, light source 34 may emit a continuous wave light beam that may be split into one or more communication signals.

$2^P$-PSK modulation system 38 modulates the communication signal according to $2^P$-PSK modulation to encode data $d_i$ into the signal. According to one embodiment, modulation system 38 includes modulators 42 and 46. Modulators 42 and 46 may modulate at phases 0 and $k\pi$, where $0 \leq k \leq 2$.

According to one embodiment, modulation system 38 includes one or more full phase modulators 42 and one or more fractional phase modulators 46. A full phase modulator 42 may modulate at phases 0 and $\pi$, and a fractional phase modulator 46 may modulate at phases 0 and $k\pi$, where $0 \leq k < 1$. In one embodiment, a $2^P$-PSK modulation system 38 may include p modulators, such as one full phase modulator 42 and p-1 fractional phase modulators 46a-b. In the illustrated example, 8-PSK modulation system 38 may include three modulators, such as one full phase modulator 42 and two fractional phase modulators 46a-b.

Full phase modulator 42 may represent any suitable phase modulator operable to modulate at phases 0 and $\pi$. For example, modulator 42 may represent a Mach-Zehnder modulator. A Mach-Zehnder modulator typically includes a splitter, a phase delay, a negative phase delay, and a coupler. The splitter splits a signal into a first signal and a second signal. The phase delay modulates the first signal at a first phase, and the negative phase delay modulates the second signal at a second phase that is the negative of the first phase. The coupler couples the first and second signals. Diagram 50 indicates the phases, zero and $\pi$, modulated by modulator 42.

Fractional phase modulators 46 may represent any suitable phase modulator operable to modulate at phases 0 and $k\pi$, where $0 \leq k \leq 1$. Diagram 54a indicates the phases at which fractional phase modulator 46a modulates, and diagram 54b indicates the phases at which fractional phase modulator 46b modulates. According to the illustrated embodiment, fractional phase modulator 46a modulates at 0 and $\pi/2$, and fractional phase modulator 46b modulates at 0 and $\pi/4$. An example of a fractional phase modulator 46 is described in more detail in reference to FIG. 2A.

Diagram 58 illustrates the phases at which the resulting signal is modulated. According to diagram 58, the resulting signal is modulated at phases $c\pi/4$, where c=0, 1, 2, . . . , 7.

Components of system 10 may comprise logic, an interface, a memory, or any suitable combination of the preceding. Logic may refer to hardware, software, other logic, or any suitable combination of the preceding. Certain logic may manage the operation of a device, and may comprise, for example, a processor. An interface may receive input, send output, perform suitable processing of the input or output or both, or any combination of the preceding, and may comprise one or more ports, conversion software, or both. A memory may store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Modifications, additions, or omissions may be made to system 10 without departing from the scope of the invention. The components system 10 may be integrated or separated according to particular needs. Moreover, the operations of system 10 may be performed by more, fewer, or other components. Additionally, operations of system 10 may be performed using any suitable logic. As used in this document, "each" refers to each member of a set or each member of a subset of a set.

Figure 2A:
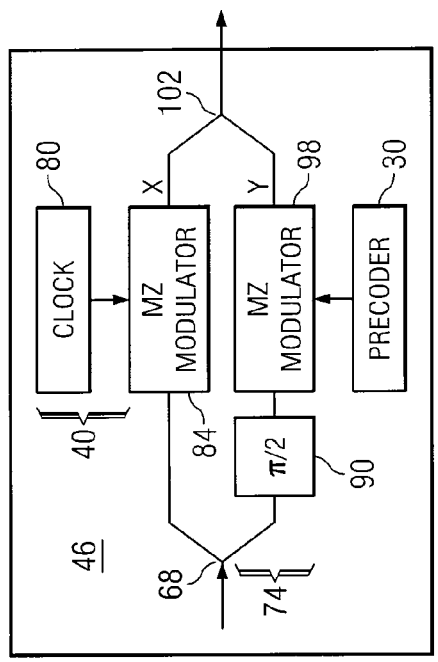
FIG. 2A illustrates one embodiment of a fractional phase modulator that may be used with the system of FIG. 1.
Figure 2B:
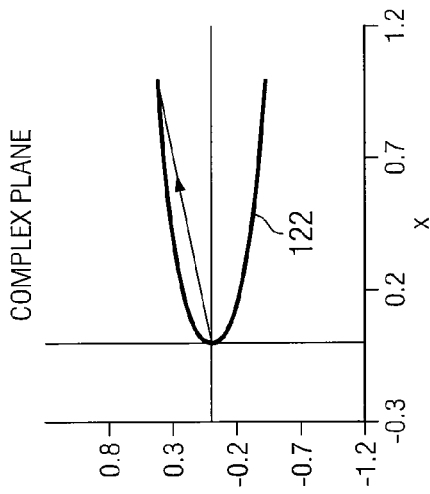
FIG. 2B illustrates phases modulated by the fractional phase modulator of FIG. 2A.
Figure 2B:
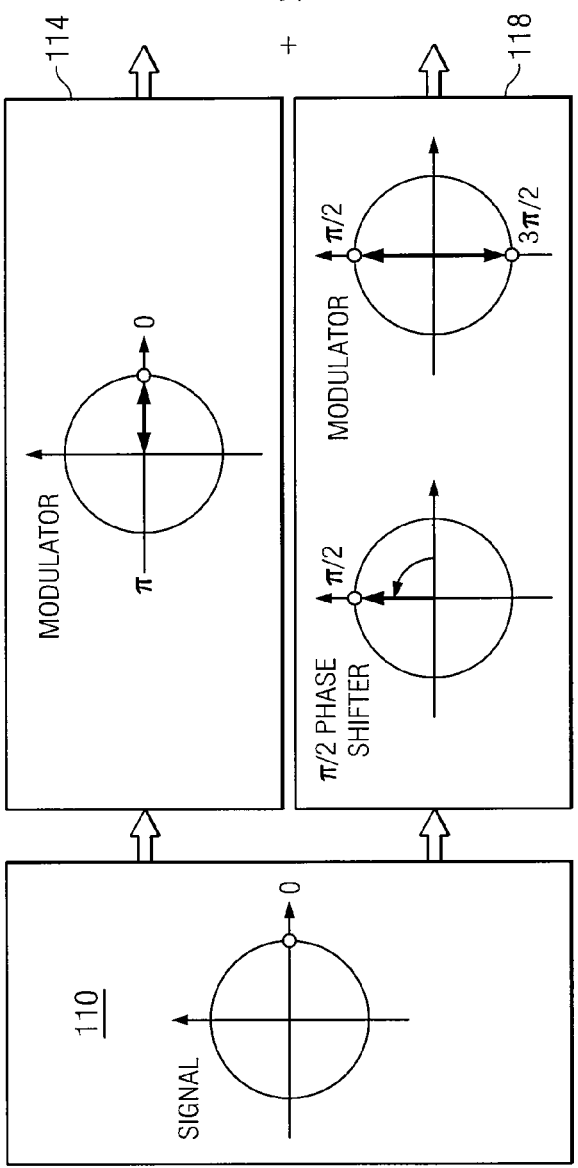

FIG. 2A illustrates one embodiment of fractional phase modulator 46 that may be used with system 10 of FIG. 1, and FIG. 2B illustrates phases modulated by fractional phase modulator 46 of FIG. 2A. According to the illustrated embodiment, fractional phase modulator 46 includes a splitter 68, a first arm 70, a second arm 74, and coupler 102 coupled as shown. First arm 70 includes a clock 80 and a first modulator 84, and second arm 74 includes a phase shifter 90 and second modulator 98 coupled as shown.

In operation, splitter 68 yields a first communication signal with an amplitude x, and a second communication signal with an amplitude y. First arm 70 modulates the first communication signal at a constant phase, and second arm 74 modulates the second communication signal at a varying phase to encode data. In one example, first arm 70 modulates at phase 0, and second arm 74 modulates at phases $\pi/2$ and $3\pi/2$. The ratio of amplitude x and amplitude y may correspond to the phase shift of the combined signal. In the example, if the ratio y/x=m, then the phase shift is arctangent (m). For example, if y/x=1, then the phase shift is $+/-\pi/4$. Accordingly, adjusting the ratio changes the phase shift.

In the illustrated embodiment, splitter 68 receives a communication signal. Diagram 110 indicates that the communication signal is not modulated prior to entering splitter 68. Splitter 68 splits the communication signal into the first communication signal and the second communication signal.

First arm 70 modulates the first communication signal at a constant phase, and may operate as a non-return-to-zero (NRZ) Mach-Zehnder modulator. Clock 80 provides a clock signal for modulator 84. The clock signal may have any suitable frequency, for example, approximately two times an NRZ frequency, such as 40 to 50 gigahertz (GHz), for example, approximately 43.018 GHz. The clock signal may have any suitable amplitude, for example, approximately $V_\pi$, and may have any suitable amplitude bias, such as at quadrature.

First modulator 84 modulates the first communication signal according to the clock signal from clock 80. First modulator 84 may represent any suitable modulator, for example, a full phase modulator such as a Mach Zehnder modulator. Diagram 114 indicates that first signal 104a is modulated at $0\pi$.

Precoder 30 provides data signal $a_i$ that represents data $d_i$. Data signal $a_i$ may have any suitable amplitude, such as approximately $2V_\pi$, and may have any suitable bias, such as approximately null.

Second arm 72 modulates the second communication signal at a varying phase to encode data, and may operate in a manner similar to that of an arm of a DPSK modulator. Phase shifter 90 shifts the phase of the second communication signal by any suitable phase shift, for example, approximately $\pi/2$. Second modulator 84 modulates the second communication signal according to data signal $a_i$ to encode data $d_i$. Second modulator 84 may represent any suitable modulator, for example, a full phase modulator such as a Mach Zehnder modulator. Diagram 118 indicates that the second communication signal is shifted by $\pi/2$ and then modulated at $\pi/2$ and $3\pi/2$.

Coupler 102 couples the first and second communication signals received from first and second modulators 84 and 98, respectively. Diagram 122 illustrates the resulting signal in the complex plane. The x axis represents the real axis, and the y axis represents the orthogonal imaginary axis.

Modifications, additions, or omissions may be made to fractional phase modulator 46 without departing from the scope of the invention. The components of fractional phase modulator 46 may be integrated or separated according to particular needs. Moreover, the operations of fractional phase modulator 46 may be performed by more, fewer, or other components. Additionally, operations of fractional phase modulator 46 may be performed using any suitable logic.

Figure 3:
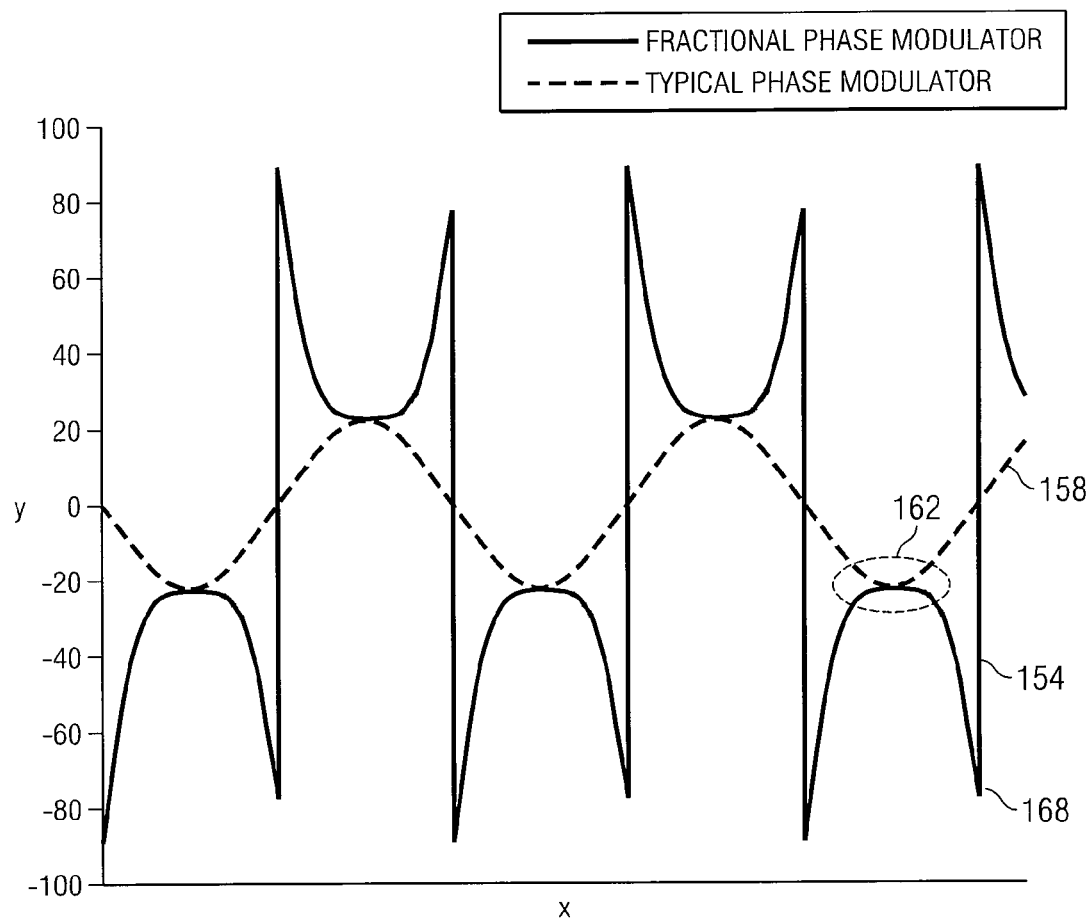
FIG. 3 illustrates an example of phases modulated by a fractional phase modulator.

FIG. 3 illustrates an example of phases modulated by one embodiment of fractional phase modulator 46. In diagram 150, the x axis represents time, and the y axis represents the phases of the signal. Diagram 150 includes waveforms 154 and 158. Waveform 154 represents phases modulated by fractional phase modulator 46, and waveform 158 is a sine waveform representing phases modulated by a typical phase modulator.

Peak regions 162 of waveform 154 maintain a constant value longer than peak regions 162 of waveform 158, indicating that fractional phase modulator 46 may yield purer phases. Spikes 168 may be reduced by a return-to-zero (RZ) modulation.

Modifications, additions, or omissions may be made to the waveform without departing from the scope of the invention.

Figure 4:
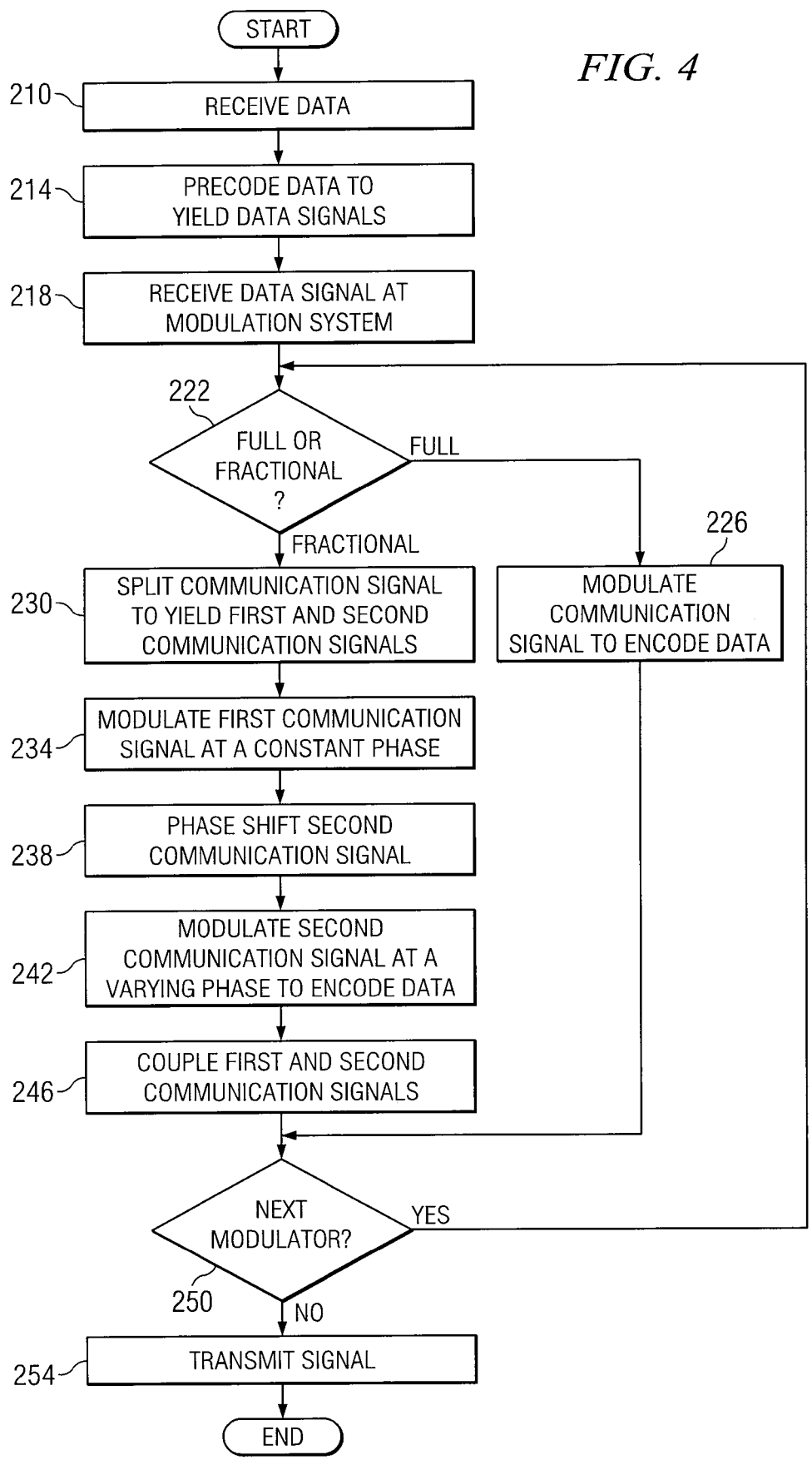
FIG. 4 illustrates one embodiment of method for modulating a signal according to phase-shift keying (PSK) modulation.

FIG. 4 illustrates one embodiment of method for modulating a signal according to phase-shift keying (PSK) 0000 modulation. The method begins at step 210, where precoder 30 receives data $d_i$. Precoder 30 precodes data $d_i$ to yield data signals $a_i$ at step 214.

Modulation system 38 receives data signals $a_i$ at step 218. Modulation system 38 includes a full phase modulator 42 and fractional phase modulators 46 at step 222. If data signal $a_i$ is received at full phase modulator 42 at step 222, the method proceeds to step 226. Modulator 42 modulates a communication signal at phases 0 and $\pi$ at step 226 according to data signal $a_i$ to encode data $d_i$ into the communication signal. The method then proceeds to step 250.

If data signal $a_i$ is received at a fractional phase modulator 46 at step 222, the method proceeds to step 230. Splitter 68 splits a communication signal into a first communication signal and a second communication signal at step 230. Modulator 84 modulates the first communication signal at a constant phase at step 234 according to a clock signal received from clock 80.

Phase shifter 90 shifts the phase of the second communication signal at step 238. The phase may be shifted by $\pi/2$. Modulator 98 modulates the second communication signal at step 242 at a varying phase according to data signal $a_i$ to encode data $d_i$ into the second communication signal. Coupler 102 couples the first and second communication signals at step 246. The method then proceeds to step 250.

There may be a next modulator of modulation system 38 at step 250. If there is a next modulator, the method returns to step 222. If there is no next modulator, the method proceeds to step 254. Transmitter 20 transmits the signal at step 254. After the signal is transmitted, the method ends.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a fractional phase modulator may split a signal into first and second signals, where the ratio of the amplitudes of the signals correspond to a particular phase shift. The first signal may be modulated at a constant phase, and the second signal may be modulated at a varying phase in order to encode data. The first and second signals may be combined for to yield a transmitted signal with a purer phase.

Another technical advantage of one embodiment may be that the first and second signals may be modulated by Mach-Zehnder modulators. The Mach-Zehnder modulators may modulate with a purer phase, which may yield a transmitted signal with a purer phase.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system operable to modulate a signal according to phase-shift keying (PSK) modulation, comprising:
    one or more phase modulators, the one or more phase modulators comprising one or more fractional phase modulators, a fractional phase modulator comprising:
        a splitter operable to split a communication signal to yield a first communication signal having a first amplitude and a second communication signal having a second amplitude, the ratio of the first amplitude and the second amplitude corresponding to a phase shift;
        a phase shifter coupled to the splitter and operable to phase shift at least one of the first communication signal and the second communication signal;
        a first modulator coupled to the splitter and operable to modulate the first communication signal at a constant phase;
        a second modulator coupled to the splitter and operable to modulate the second communication signal at a plurality of phases corresponding to the phase shift to encode data; and
        a coupler coupled to the first modulator and the second modulator and operable to couple the first communication signal and the second communication signal.

2. The system of claim 1, the first modulator operable to modulate the first communication signal at the constant phase by:
    modulating the first communication signal at a clock frequency.

3. The system of claim 1, the one or more phase modulators further comprising:
    a full phase modulator having a phase shift of $\pi$ and operable to modulate the communication signal.

4. The system of claim 1, the one or more phase modulators further comprising:
    a full phase modulator comprising a Mach-Zehnder modulator operable to modulate the communication signal.

5. The system of claim 1, wherein:
    the first modulator comprises a first full phase modulator having a phase shift of $\pi$; and
    the second modulator comprises a second full phase modulator.

6. The system of claim 1, wherein:
    the first modulator comprises a first Mach-Zehnder modulator; and
    the second modulator comprises a second Mach-Zehnder modulator.

7. The system of claim 1, the phase shifter operable to phase shift the at least one of the first communication signal and the second communication signal by:
   phase shifting by approximately one-half $\pi$.

8. A method operable to modulate a signal according to phase-shift keying (PSK) modulation, comprising:
   performing the following for each fractional phase modulator of one or more fractional phase modulators:
      splitting a communication signal using a splitter to yield a first communication signal having a first amplitude and a second communication signal having a second amplitude, the ratio of the first amplitude and the second amplitude corresponding to a phase shift;
      phase shifting at least one of the first communication signal and the second communication signal;
      modulating the first communication signal at a constant phase;
      modulating the second communication signal at a plurality of phases corresponding to the phase shift to encode data; and
      coupling the first communication signal and the second communication signal.

9. The method of claim 8, wherein modulating the first communication signal at the constant phase further comprises:
   modulating the first communication signal at a clock frequency.

10. The method of claim 8, further comprising:
    modulating the communication signal using a full phase modulator having a phase shift of $\pi$.

11. The method of claim 8, further comprising:
    modulating the communication signal using a full phase modulator comprising a Mach-Zehnder modulator.

12. The method of claim 8, wherein the each fractional phase modulator comprises:
    the first modulator comprises a first full phase modulator having a phase shift of $\pi$; and
    the second modulator comprises a second full phase modulator.

13. The method of claim 8, wherein the each fractional phase modulator comprises:
    the first modulator comprises a first Mach-Zehnder modulator; and
    the second modulator comprises a second Mach-Zehnder modulator.

14. The method of claim 8, wherein phase shifting the at least one of the first communication signal and the second communication signal comprises:
    phase shifting by approximately one-half $\pi$.

15. Logic operable to modulate a signal according to phase-shift keying (PSK) modulation, the logic embodied in a computer-readable storage medium and operable to:
    perform the following for each fractional phase modulator of one or more fractional phase modulators:
       split a communication signal to yield a first communication signal having a first amplitude and a second communication signal having a second amplitude, the ratio of the first amplitude and the second amplitude corresponding to a phase shift;
       phase shift at least one of the first communication signal and the second communication signal;
       modulate the first communication signal at a constant phase;
       modulate the second communication signal at a plurality of phases corresponding to the phase shift to encode data; and
       couple the first communication signal and the second communication signal.

16. The logic of claim 15, operable to modulate the first communication signal at the constant phase by:
    modulating the first communication signal at a clock frequency.

17. The logic of claim 15, operable to:
    modulate the communication signal using a full phase modulator having a phase shift of $\pi$.

18. The logic of claim 15, operable to:
    modulate the communication signal using a full phase modulator comprising a Mach-Zehnder modulator.

19. The logic of claim 15, wherein the each fractional phase modulator comprises:
    the first modulator comprises a first full phase modulator having a phase shift of $\pi$; and
    the second modulator comprises a second full phase modulator.

20. The logic of claim 15, wherein the each fractional phase modulator comprises:
    the first modulator comprises a first Mach-Zehnder modulator; and
    the second modulator comprises a second Mach-Zehnder modulator.

21. The logic of claim 15, operable to phase shift the at least one of the first communication signal and the second communication by:
    phase shifting by approximately one-half $\pi$.

22. A system operable to modulate a signal according to phase-shift keying (PSK) modulation, comprising:
    means for performing the following for each fractional phase modulator of one or more fractional phase modulators, comprising:
       means for splitting a communication signal to yield a first communication signal having a first amplitude and a second communication signal having a second amplitude, the ratio of the first amplitude and the second amplitude corresponding to a phase shift;
       means for phase shifting at least one of the first communication signal and the second communication signal;
       means for modulating the first communication signal at a constant phase;
       means for modulating the second communication signal at a plurality of phases corresponding to the phase shift to encode data; and
       means for coupling the first communication signal and the second communication signal.

23. A system operable to modulate a signal according to phase-shift keying (PSK) modulation, comprising:
    one or more phase modulators, the one or more phase modulators comprising:
       a full phase modulator having a phase shift of $\pi$, the full phase modulator comprising a Mach-Zehnder modulator operable to modulate a communication signal; and
       one or more fractional phase modulators, a fractional phase modulator comprising:
          a splitter operable to split the communication signal to yield a first communication signal having a first amplitude and a second communication signal having a second amplitude, the ratio of the first amplitude and the second amplitude corresponding to a phase shift;
          a phase shifter coupled to the splitter and operable to phase shift at least one of the first communication signal and the second communication signal by approximately one-half $\pi$;

a first modulator coupled to the splitter and operable to modulate the first communication signal at a constant phase by modulating the first communication signal at a clock frequency, the first modulator comprising a first full phase modulator having a phase shift of π, the first modulator comprising a first Mach-Zehnder modulator;

a second modulator coupled to the splitter and operable to modulate the second communication signal at a plurality of phases corresponding to the phase shift to encode data, the second modulator comprising a second full phase modulator, the second modulator comprising a second Mach-Zehnder modulator; and a coupler coupled to the first modulator and the second modulator and operable to couple the first communication signal and the second communication signal.

* * * * *